(12) United States Patent
Han et al.

(10) Patent No.: US 7,905,651 B2
(45) Date of Patent: Mar. 15, 2011

(54) DIFFUSIVELY REFLECTIVE FILM, METHOD OF MANUFACTURING THE SAME, LIGHT GUIDING MODULE, BACKLIGHT ASSEMBLY, AND LIQUID CRYSTAL DISPLAY APPARATUS HAVING THE SAME

(75) Inventors: Byung-Woong Han, Incheon-si (KR); Kyu-Seok Kim, Yongin-si (KR); Jeong-Hwan Lee, Suwon-si (KR); Young-Bee Chu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/923,972

(22) Filed: Oct. 25, 2007

(65) Prior Publication Data

US 2008/0043492 A1 Feb. 21, 2008

Related U.S. Application Data

(62) Division of application No. 10/732,685, filed on Dec. 9, 2003, now abandoned.

(30) Foreign Application Priority Data

Jul. 2, 2003 (KR) .................................. 2003-44571

(51) Int. Cl.
*F21V 7/04* (2006.01)
(52) U.S. Cl. ......... 362/627; 362/618; 362/619; 362/620
(58) Field of Classification Search .................. 362/627, 362/606, 608, 618, 619, 633, 632, 634, 620
See application file for complete search history.

(56) References Cited

U.S. PATENT DOCUMENTS

| 2,948,191 | A | * | 8/1960 | Hodgson, Jr. et al. | ........ 359/538 |
| 5,471,327 | A | * | 11/1995 | Tedesco et al. | ................. 359/15 |
| 5,485,354 | A | * | 1/1996 | Ciupke et al. | ................. 362/619 |
| 5,673,999 | A | * | 10/1997 | Koenck | ......................... 362/263 |
| 6,280,063 | B1 | * | 8/2001 | Fong et al. | .................... 362/333 |
| 6,425,673 | B1 | * | 7/2002 | Suga et al. | .................... 362/613 |
| 6,520,655 | B2 | * | 2/2003 | Ohuchi | ........................ 362/612 |

(Continued)

FOREIGN PATENT DOCUMENTS

JP    08-087909    4/1996

(Continued)

OTHER PUBLICATIONS

English Translation of JP 11-109864.*

*Primary Examiner* — Evan Dzierzynski
(74) *Attorney, Agent, or Firm* — Innovation Counsel LLP

(57) ABSTRACT

A diffusively reflective film includes a base film, a light reflection layer and a light diffusion layer. The base film is flexible. The light reflection layer is disposed on the base film. The light reflection film reflects a first light. The light diffusion layer is disposed on the light reflection layer. The light diffusion layer diffuses the first light to form a second light. The diffusively reflective film may be bent to cover the light guide plate without being broken so as to increase the amount of light. Thus, a display quality is enhanced. Further, the diffusively reflective film covers the first side face, the second side face and the first face of light guide plate at once. Thus, productivity is enhanced and its manufacturing cost is reduced.

5 Claims, 18 Drawing Sheets

U.S. PATENT DOCUMENTS

| | | | |
|---|---|---|---|
| 6,669,349 B2 * | 12/2003 | Mabuchi | 362/628 |
| 6,913,365 B2 * | 7/2005 | Masaki et al. | 362/627 |
| 2001/0035923 A1 * | 11/2001 | Cha et al. | 349/65 |
| 2003/0123244 A1 * | 7/2003 | Ishitaka | 362/31 |
| 2003/0179580 A1 * | 9/2003 | Ito et al. | 362/306 |
| 2003/0189821 A1 * | 10/2003 | Moon | 362/31 |
| 2004/0052079 A1 * | 3/2004 | Nakano | 362/343 |

FOREIGN PATENT DOCUMENTS

| | | |
|---|---|---|
| JP | 1991318945 A | 12/1997 |
| JP | 10-000730 | 1/1998 |
| JP | 11109864 A * | 4/1999 |
| JP | 1999231215 | 8/1999 |
| JP | 2002-116440 | 4/2002 |
| JP | 2002100230 | 4/2002 |

* cited by examiner

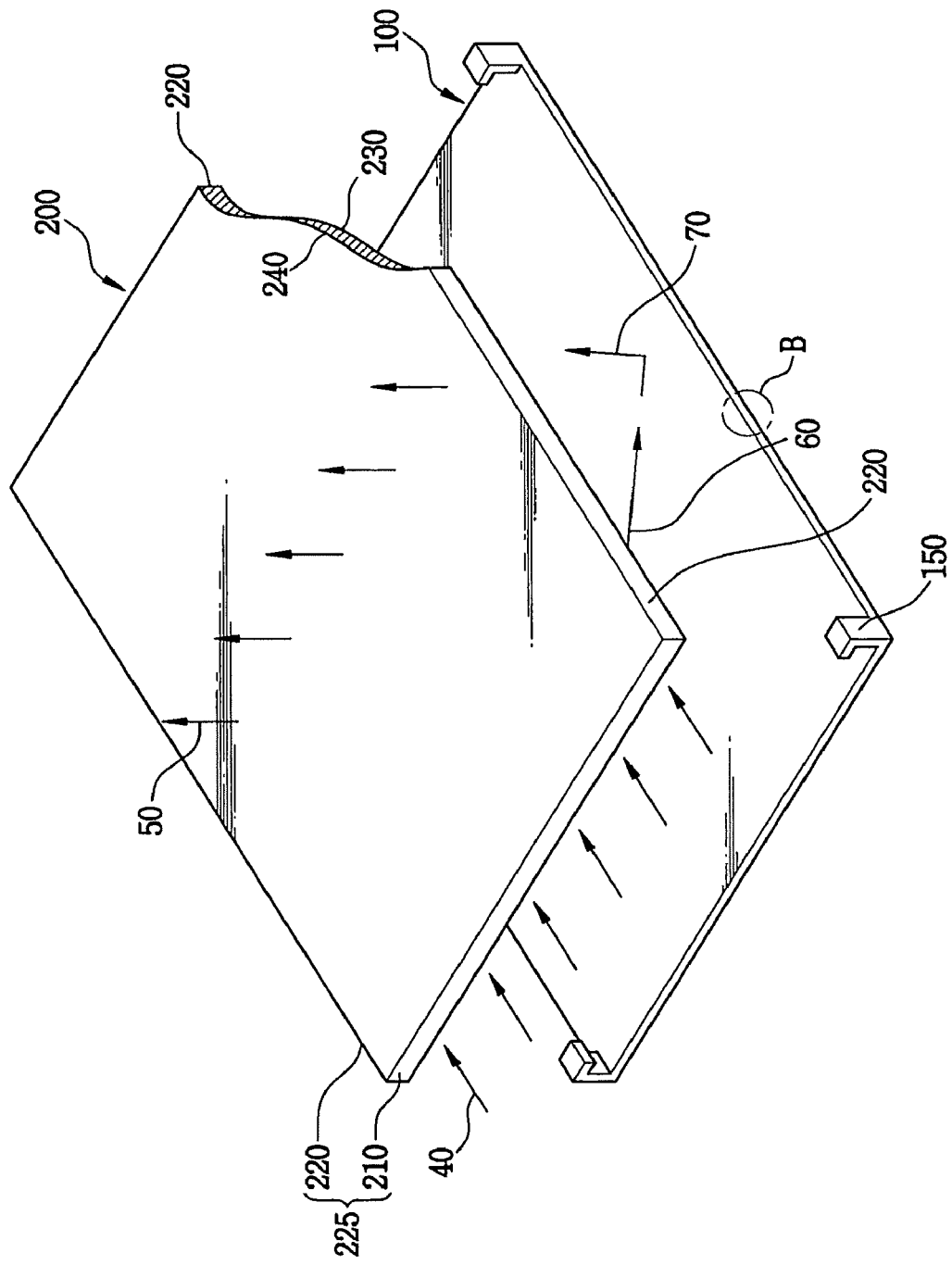

DIFFUSIVELY REFLECTIVE FILM, METHOD OF MANUFACTURING THE SAME, LIGHT GUIDING MODULE, BACKLIGHT ASSEMBLY, AND LIQUID CRYSTAL DISPLAY APPARATUS HAVING THE SAME

CROSS REFERENCE TO RELATED APPLICATION

This application is a Divisional of U.S. patent application Ser. No. 10/732,685, filed Dec. 9, 2003, now abandoned the contents of which is incorporated by reference in its entirety.

CROSS-REFERENCE TO RELATED APPLICATIONS

This application relies for priority upon Korean Patent Application No. 2003-44571 filed on Jul. 2, 2003, the contents of which are herein incorporated by reference in its entirety.

BACKGROUND OF THE INVENTION

1. Field of the Invention

The present invention relates to a diffusively reflective film, a method of manufacturing the diffusively reflective film, a light guiding module, a backlight assembly and a liquid crystal display apparatus having the same, and more particularly to the diffusively reflective film that is bendable, a method of manufacturing the diffusively reflective film, a light guiding module, a backlight assembly and a liquid crystal display apparatus having the same.

2. Description of the Related Art

Generally, a liquid crystal display apparatus displays an image via liquid crystal molecules. The liquid crystal display apparatus includes a liquid crystal controlling part and a light providing part. The liquid crystal controlling part controls an arrangement of liquid crystal molecules so as to display an image. The light providing part provides the liquid crystal controlling part with a light.

The light providing part influences a display quality. When a uniformity of light luminance is lowered, the display quality of the liquid crystal display apparatus is deteriorated, regardless of the liquid crystal controlling part.

A general light providing part includes a lamp, a light guide plate, optical sheets and a light reflection plate.

The lamp generates light that is applied to the liquid crystal controlling part. A light emitting diode (LED) or a cold cathode fluorescent lamp (CCFL) may be used as the lamp.

The light guide plate has a plate-shape or a wedge-shape. The light guide plate transforms a one-dimensional light into a two-dimensional light.

The optical sheets enhance a luminance uniformity of light that exits from the light guide plate. The optical sheets may include a diffusion sheet, a prism sheet, etc.

The reflection plate reflects light leaked from the light guide plate toward the light guide plate again.

An Enhanced Specular Reflection film (ESR film: trade mark of 3M) is mainly used as a reflection plate. The enhanced specular reflection film is lightweight, thin and has a high reflectivity. However, the enhanced specular reflection film is broken, when the enhanced specular reflection film is bent to form an angle above about 90°.

Recently, the reflection plate covers the light guide plate's face except for a light exiting face of the light guide plate so as to enhance the luminance of the light.

Thus, in order to cover the faces of the light guide plate with the enhanced specular reflection film, the enhanced specular reflection films corresponding to each face of the light guiding plate are cut out and attached on each face of the light guiding plate. That is because the enhanced specular reflection film is broken, when the specular reflection film is bent to form an angle that is above about 90°.

Thus, productivity decreases and a cost of manufacturing increases.

SUMMARY OF THE INVENTION

Accordingly, the present invention is provided to substantially obviate one or more problems due to limitations and disadvantages of the related art.

A diffusively reflective film that diffusively reflects light is provided. The diffusive reflection is bendable without being broken.

In one aspect of the present invention, a method of manufacturing the diffusively reflective film is provided.

In another aspect of the present invention, a light guiding module including the diffusively reflective film is provided. The light guiding module enhances a luminance and a uniformity of light.

In another aspect of the present invention, a backlight assembly including the diffusively reflective film is provided.

In another aspect of the present invention, a liquid crystal display device including the diffusively reflective film is provided.

The diffusively reflective film includes a base film, a light reflection layer and a light diffusion layer. The base film is flexible. The light reflection layer is disposed on the base film. The light reflection film reflects a first light. The light diffusion layer is disposed on the light reflection layer. The light diffusion layer diffuses the first light to form a second light.

According to the method of manufacturing the diffusively reflective film, a light reflection layer is formed on a base film that is flexible. The light reflection layer reflects a first light. Then, a light diffusing layer is formed on the light reflection layer. The light diffusing layer diffuses the first light.

The light guiding module includes a light guide plate and a diffusively reflective film. The light guide plate transforms a first light having a first light distribution into a second light having a second light distribution, so that the second light exits the light guide plate. The diffusively reflective film covers a portion of the light guide plate to diffusively reflect a third light that leaks from the portion of the light guide plate toward the light guide plate.

The backlight assembly includes a receiving container, a lamp, a light guide plate and a diffusively reflective film. The lamp is disposed in the receiving container. The lamp generates a first light having a first light distribution. The light guide plate is disposed in the receiving container. The light guide plate transforms the first light into a second light having a second light distribution. The diffusively reflective film is disposed in the receiving container. The diffusively reflective film diffusively reflects a third light that leaks from the light guide plate toward the light guide plate.

The liquid crystal display apparatus includes a receiving container, a lamp, a light guide plate, a diffusively reflective film and a liquid crystal display panel. The lamp is disposed in the receiving container. The lamp generates a first light having a first light distribution. The light guide plate is disposed in the receiving container. The light guide plate transforms the first light into a second light having a second light distribution. The diffusively reflective film is disposed in the receiving container. The diffusively reflective film diffusively reflects a third light that leaks from the light guide plate toward the light guide plate. The liquid crystal display panel transforms the second light into an image light containing image information.

According to the present invention, the diffusively reflective film may be bent to cover the light guide plate without being broken so as to increase the amount of light. Thus, a display quality is enhanced.

Further, the diffusively reflective film covers the first side face, the second side face and the first face of light guide plate at once. Thus, productivity is enhanced and its manufacturing cost is reduced.

BRIEF DESCRIPTION OF THE DRAWINGS

The above and other features and advantage points of the present invention will become more apparent by describing exemplary embodiments in detail thereof with reference to the accompanying drawings, in which:

FIG. 6 is an exploded perspective view showing a light guiding module according to a fifth exemplary embodiment of the present invention;

DESCRIPTION OF THE PREFERRED EMBODIMENTS

Hereinafter the preferred embodiment of the present invention will be described in detail with reference to the accompanied drawings.

Embodiments of Diffusively Reflective Films

Embodiment 1

Figure 1:
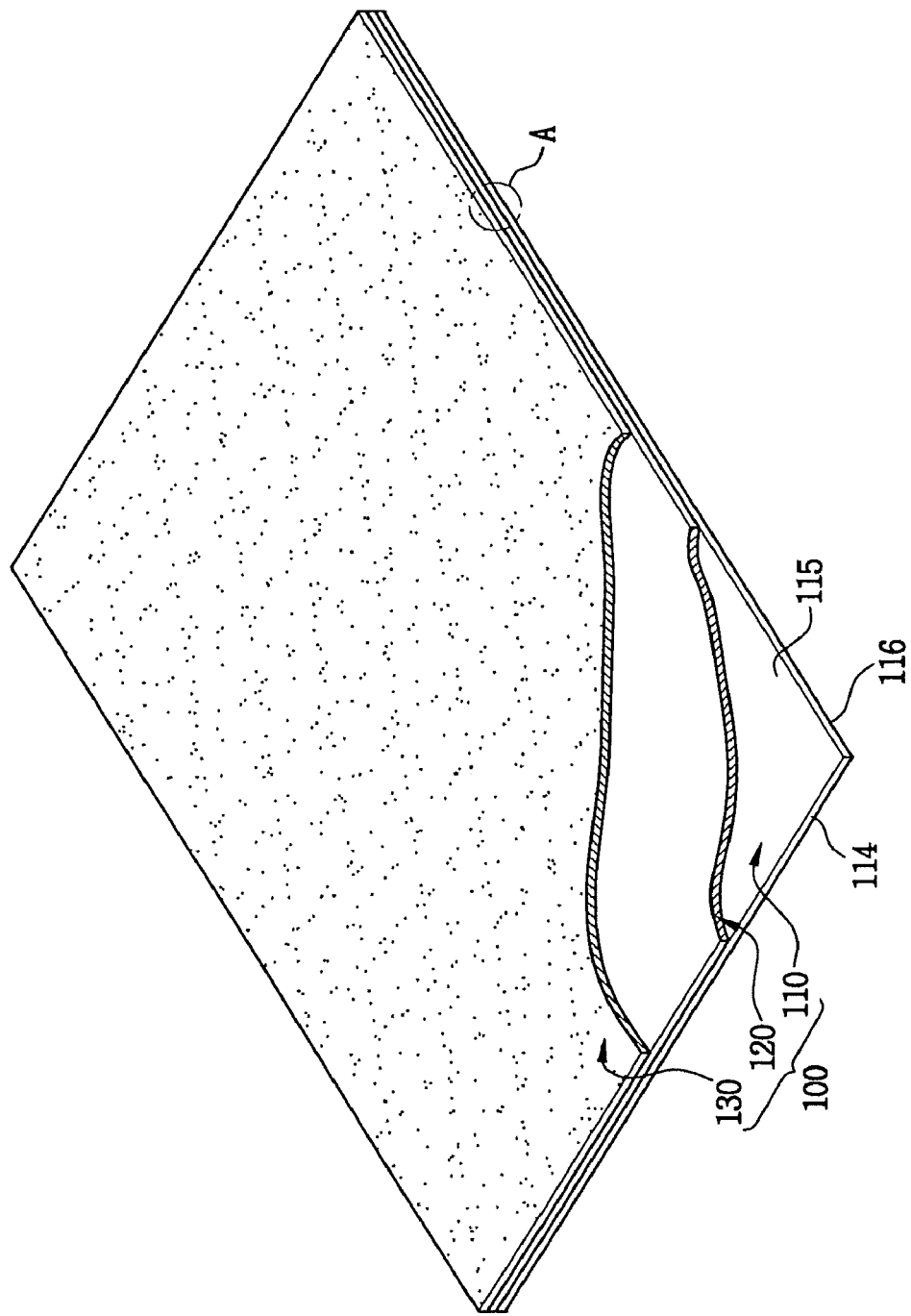
FIG. 1 is a partially cut out perspective view showing a diffusively reflective film according to a first exemplary embodiment of the present invention.
Figure 2:
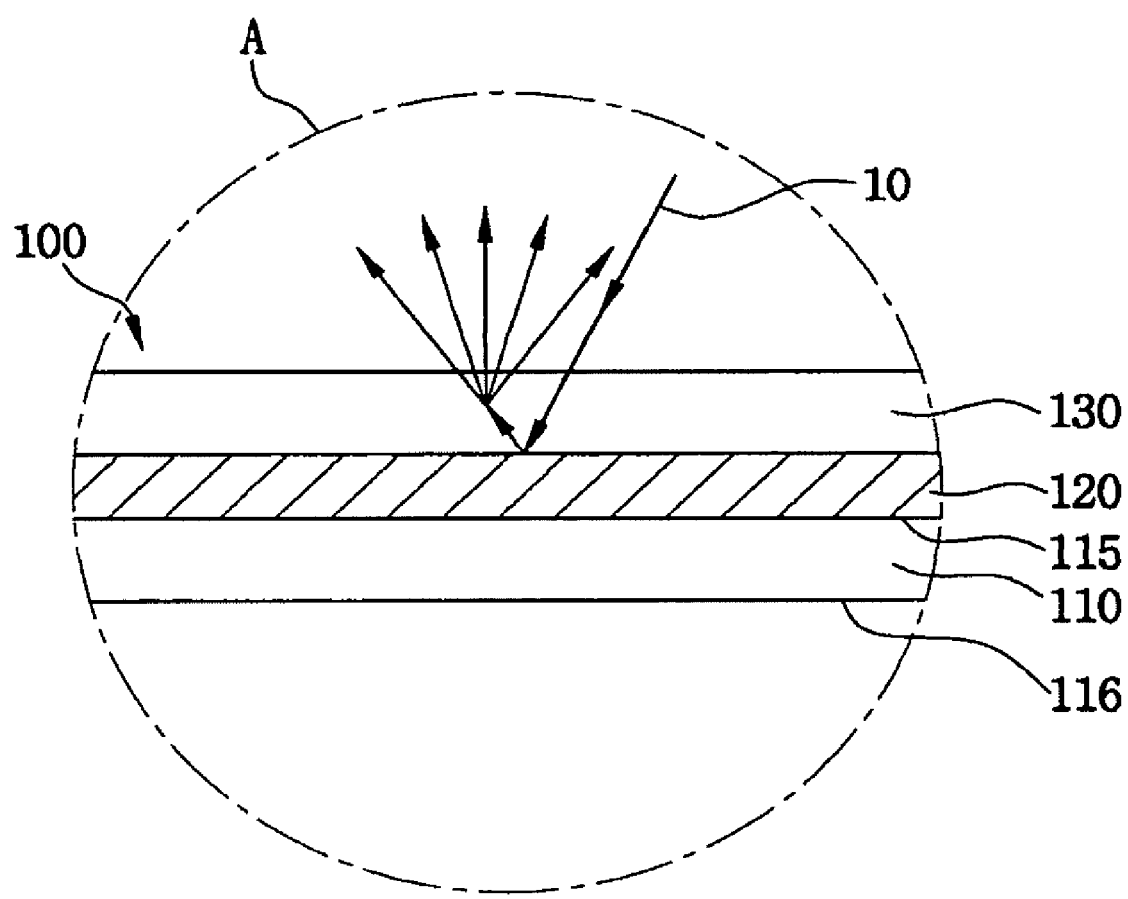
FIG. 2 is an enlarged view of a portion 'A' of FIG. 1.
Figure 3:
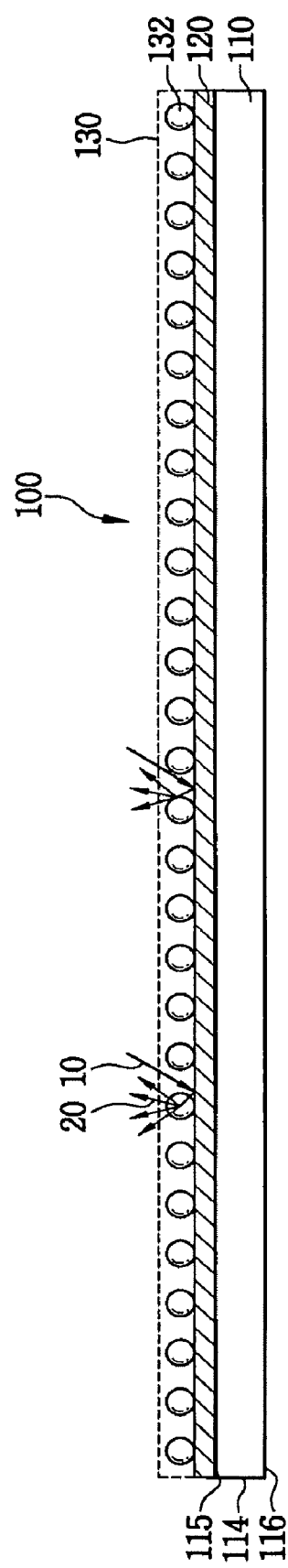
FIG. 3 is a schematic cross-sectional view showing a diffusively reflective film of FIG. 1.

FIG. 1 is a partially cut out perspective view showing a diffusively reflective film according to a first exemplary embodiment of the present invention, FIG. 2 is an enlarged view of a portion 'A' of FIG. 1, and FIG. 3 is a schematic cross-sectional view showing a diffusively reflective film of FIG. 1.

Referring to FIGS. 1 to 3, a diffusively reflective film 100 includes a base film 110, a light reflection layer 120 and a light diffusion layer 130.

The base film 110 has a sheet-shape. The base film 110 includes side faces 114, a first face 115 and a second face 116. The first face 115 faces with the second face 116.

The base film 110 is flexible. Thus, even when the base film 110 is bent to form an angle above 90°, the base film 110 is not broken. For example, the base film comprises polyethylene terephtahlate (PET).

The light reflection layer 120 is disposed on the first face 115 of the base film 110. The light reflection layer 120 reflects a first light 10 that is incident on the diffusively reflective film 100. The light reflection layer 120 is not broken, even when the light reflection layer 120 is bent to form an angle that is above 90°. The light reflection layer 120 may comprise a metal that is ductile.

The thickness of the light reflection layer 120 is about hundreds of nm. The light reflection layer 120 may comprise silver, aluminum (Al) or aluminum alloy. The silver, aluminum or aluminum alloy has a high reflectance and a high ductility. The light reflection layer 120 may be formed via a sputtering method or a vacuum plating.

The light diffusion layer 130 is disposed on the light reflection layer 120. The light diffusion layer 130 diffuses the first light 10 reflected on the light reflection layer 120 to form a second light 20 that exits from the diffusively reflective film 100.

Beads 132 disposed on the light reflection layer 120 may form the light diffusive layer 130. The beads 132 may be attached on the light reflection layer with an adhesive. A refractivity $n_b$ of the beads 132 is different with the refractivity $n_{air}$ of air. Each of the beads 132 may have a same size or a different size.

The first light 10 is diffused by the beads 132 to be formed the second light 20.

According to the first exemplary embodiment of the present invention, the light reflection layer 120 comprising a metal is formed on the base film 110 that is flexible.

The light diffusion layer 130 that diffuses the first light 10 reflected on the light reflection layer 120 is formed on the light reflection layer 120. The light diffusion layer includes a plurality of beads 132. Thus, the diffusive reflection layer 100 diffusively reflects light, and may be bendable according to a shape of other optical member such as a light guide plate.

Embodiment 2

Figure 4:
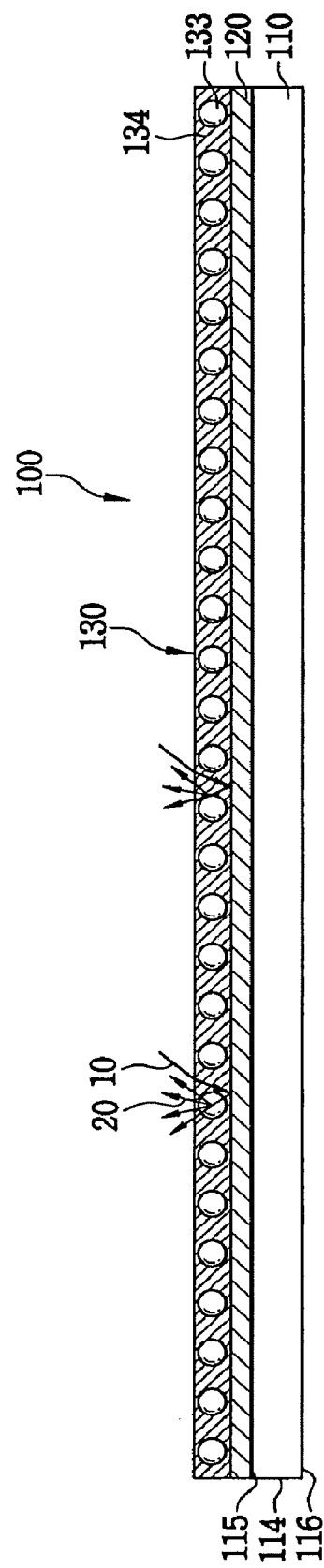
FIG. 4 is a schematic cross-sectional view showing a diffusively reflective film according to a second exemplary embodiment of the present invention.

FIG. 4 is a schematic cross-sectional view showing a diffusively reflective film according to a second exemplary embodiment of the present invention.

The diffusively reflective film is same as in Embodiment 1 except for a light diffusion layer 133. Thus, the same reference numerals will be used to refer to the same or like parts as those described in Embodiment 3 and any further explanation will be omitted.

Referring to FIG. 4, the light diffusion layer 133 includes a plurality of beads 133 and binder 134. The binder 134 has fluidity and viscosity. The beads 133 are mixed with the binder 134. The binder 134 may have different refractivity with the beads 133 so as to enhance the diffusion of a light.

The beads 133 and the binder 134 are mixed and coat the light reflection layer 120. The beads 133 and the binder 134 diffuse a first light 10 reflected on the light reflection layer 120.

According to the second exemplary embodiment of the present invention, the beads 133 and the binder 134 are mixed to form a light diffusion layer 130. The light diffusion layer 130 diffuses the first light 10 that is reflected on the light reflection layer 120. The beads 134 are tightly fixed with the light reflection layer 120 due to the binder 134.

Embodiments of a Method of Manufacturing a Diffusively Reflective Film

Embodiment 3

Figure 5A:
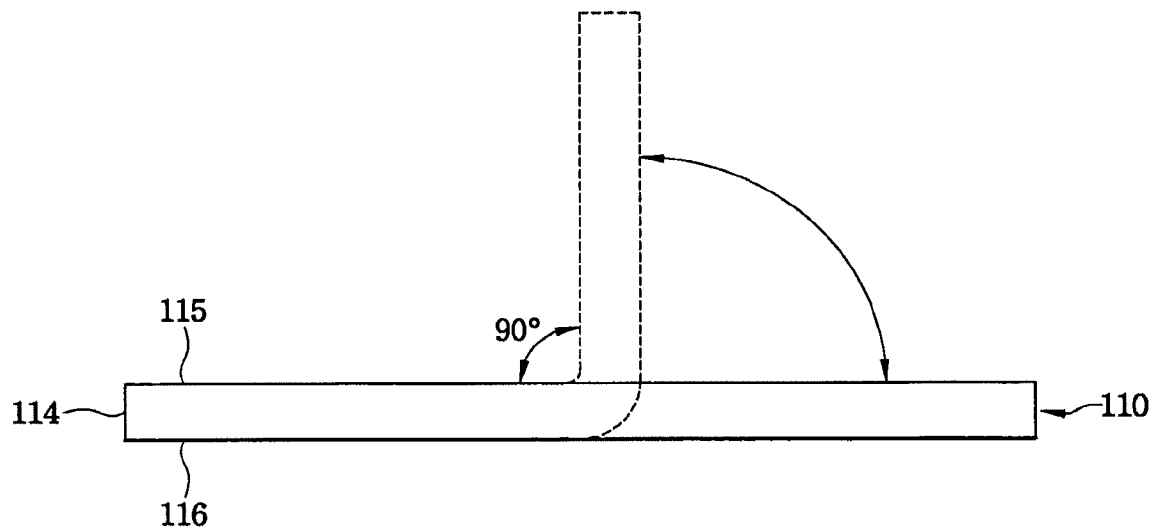
FIG. 5A is a schematic cross-sectional view showing a base film that is bendable according to a third exemplary embodiment of manufacturing a diffusively reflective film.

FIG. 5A is a schematic cross-sectional view showing a base film that is bendable according to a third exemplary embodiment of manufacturing a diffusively reflective film.

Referring to FIG. 5A, a base film 110 comprises a polyethylene terephtahlate (PET). The base film 110 has a sheet-shape of which thickness is very thin. The base film 110 includes side faces 114, a first face 115 and a second face 116. The base film 110 is not broken, even when the base film 110 is bend to form an angle above 90°.

Figure 5B:
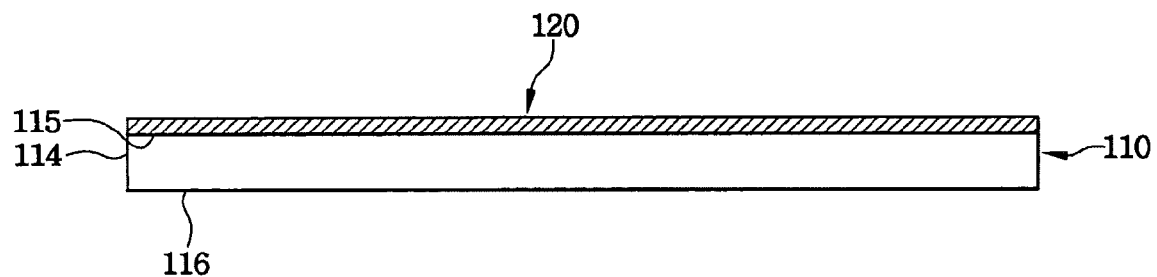
FIG. 5B is a schematic cross-sectional view showing a light reflection layer formed on a first face of the base body.

FIG. 5B is a schematic cross-sectional view showing a light reflection layer formed on a first face of the base body.

Referring to FIG. 5B, the light reflection layer 120 is formed on the first face 115 of the base film 110. The light reflection layer 120 comprises a metal that has ductility and reflectivity. The light reflection layer 120 may comprises silver (Ag), aluminum (Al) or alloy of aluminum. The light reflection layer 120 may be formed on the first face 115 of the base film 110 via a sputtering method or vacuum plating. The light reflection layer 120 has hundreds nm thickness, so that even when the light reflection layer 120 is bent with the base film 110, the light reflection layer 120 is not broken.

Figure 5C:
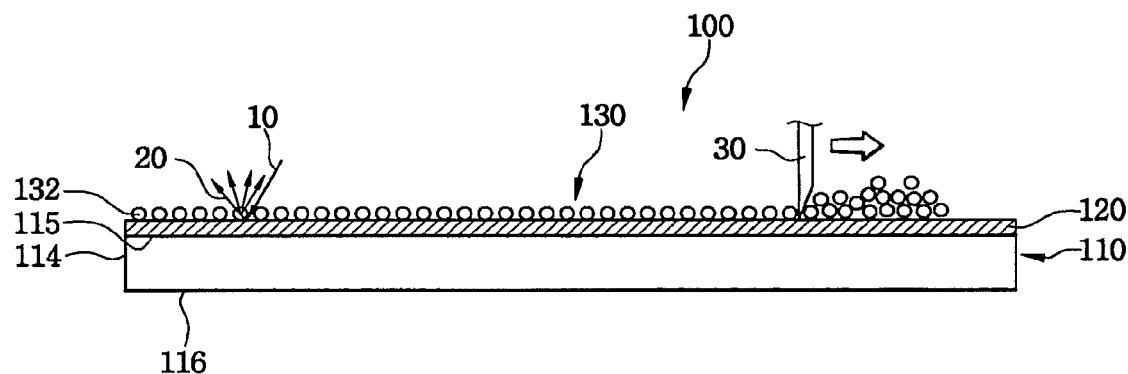
FIG. 5C is a schematic cross-sectional view showing a process of forming a light diffusion layer of FIG. 3.

FIG. 5C is a schematic cross-sectional view showing a process of forming a light diffusion layer of FIG. 3.

Referring to FIG. 5C, a plurality of beads 132 is disposed on a face of the light reflection layer 120. An adhesive is coated on the face of the light reflection layer 120.

A spreader 132 spreads the beads 132, so that the beads 132 are spread on the face of the reflection layer 120 to form a light diffusion layer 130. The beads 132 may form a multi-layered structure.

Then, an air is sprayed on the light diffusion layer 130 so as to dry the adhesive.

According to method of manufacturing the diffusively reflective film 100, the light reflection layer 120 that comprises a metal is formed on the base film 110. A plurality of beads 132 is attached on the light reflection layer 120. The diffusively reflective film 100 diffusively reflects the first light 10. The diffusively reflective film 100 may be bent without being broken.

Embodiment 4

Figure 5D:
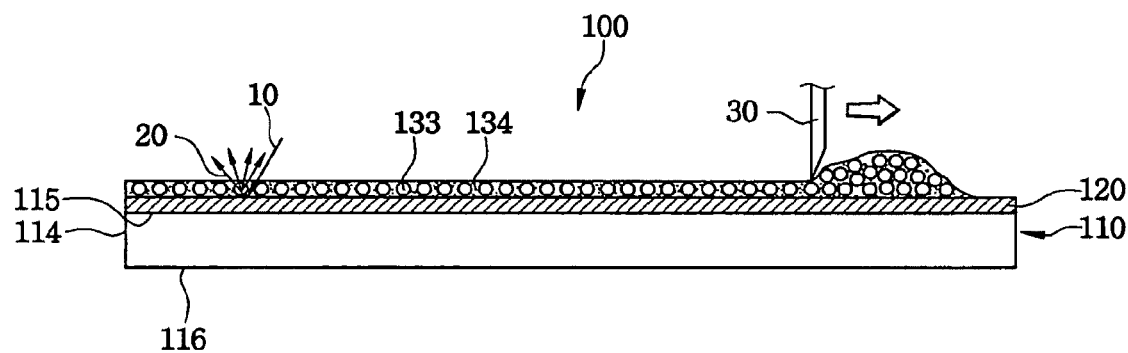
FIG. 5D is a schematic cross-sectional view showing a process of forming a light diffusion layer of FIG. 4 according to a fourth exemplary embodiment of manufacturing a diffusively reflective film.

FIG. 5D is a schematic cross-sectional view showing a process of forming a light diffusion layer of FIG. 4 according to a fourth exemplary embodiment of manufacturing a diffusively reflective film. The process of the present embodiment is the same as in Embodiment 3 except that a light diffusion layer of the present embodiment is different from the light diffusion layer in Embodiment 3. Thus, the same reference numerals will be used to refer to the same or like parts as those described in Embodiment 3 and any further explanation will be omitted.

Referring to FIG. 5D, a light diffusion material is coated on the light reflection layer 120 that is formed on the first face of the base film 110. The light diffusion material includes beads 133 and a binder 134. The beads 133 may have a same size or a different size from each other. The binder 134 has a viscosity and an adhesive property. A refractivity of the binder 134 may be equal to that of the beads 133 or not.

A spreader 30 spreads uniformly the light reflection material disposed on the light reflection layer 120. Then, the light reflection material is dried to form a light diffusion layer.

According to Embodiment 4, the light reflection material including the binder 134 and the beads 133 is disposed on the light reflection layer 120 and spread to be formed a light diffusion layer. Thus, the diffusively reflective film 100 is completed. The beads 134 are fixed tightly on the light reflection layer 120 due to the binder 134. The binder also diffuses the first light 10 to form a second light 20 that has a uniform luminance.

Embodiments of Light Guiding Module

Embodiment 5

FIG. 6 is an exploded perspective view showing a light guiding module according to a fifth exemplary embodiment of the present invention.

Referring to FIG. 6, a light guiding module 300 includes a light guide plate 200 and a diffusively reflective film 100.

The light guide plate 200 transforms a first light 40 that is a zero-dimensional light or one-dimensional light into a second light 50 that is a two-dimensional light.

The diffusively reflective film 100 reflects a third light 60 that is leaked from a portion of the light guide plate 200 toward the light guide plate 200, and transforms the third light 60 into a fourth light 70.

The diffusively reflective film 100 enwraps the portion of the light guide plate 200 so as to prohibit the third light 60 from being leaked.

The light guide plate 200 includes a side face 225, a first face 230 and a second face 240.

The side face 225 includes a first side face 210 and a second side face 220. The first light 40 enters the light guide plate 200 through the first side face 210.

The first face 230 reflects the first light 40 that enters the light guide plate 200 through the first side face 210 toward the second face 240.

The first face 230 may includes a plurality of dot patterns (not shown) so as to reflect the first light 40 effectively.

The second face 240 faces the first face 230. The first face 230 and the second face 240 are connected to the side face 225.

The second light 50 exits the light guide plate 200 via the second face 240. A distribution of the second light 50 is different with that of the first light 40.

The diffusively reflective film 100 is disposed under the light guide plate 200, such that the diffusively reflective film 100 faces the first face 230 of the light guide plate 200.

Figure 7:
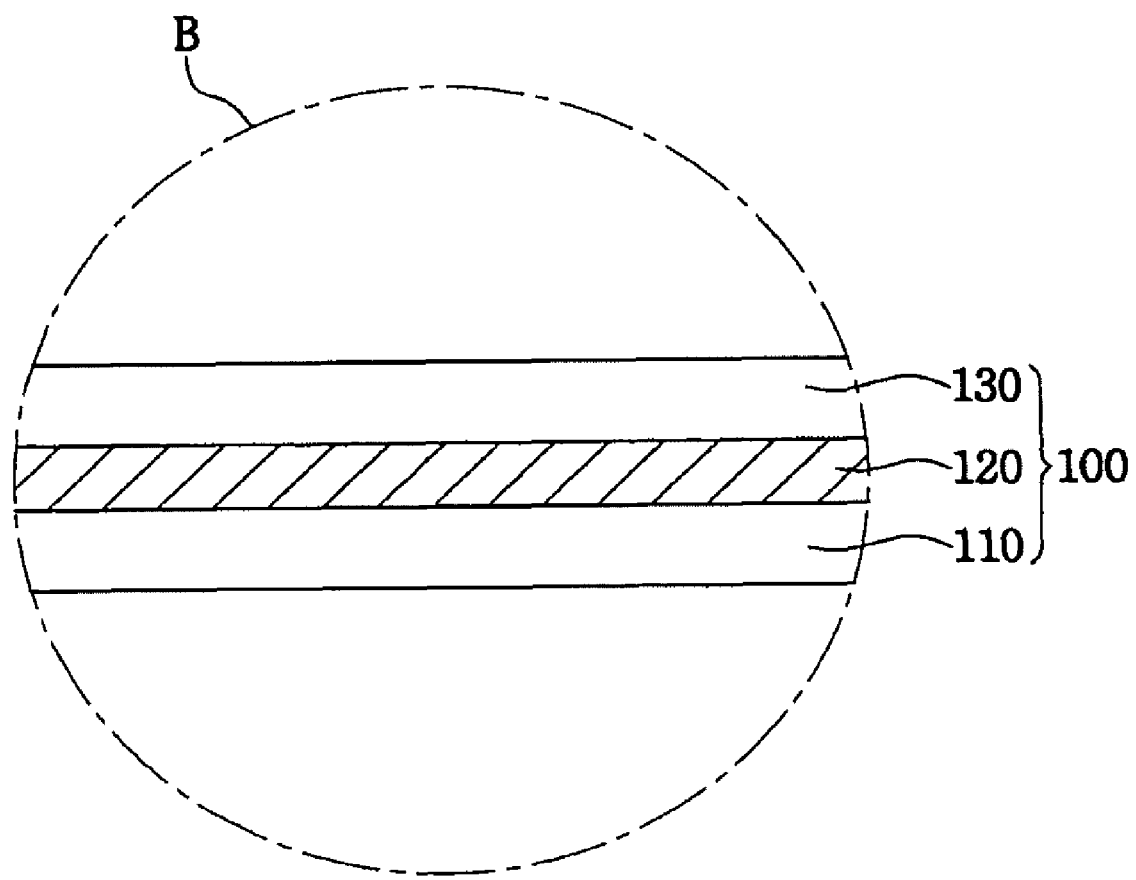
FIG. 7 is an enlarged view showing a portion 'B' of FIG. 6.

FIG. 7 is an enlarged view showing a portion 'B' of FIG. 6.

Referring to FIGS. 6 and 7, a diffusively reflective film 100 includes a base film 110, a light reflection layer 120 and a light diffusion layer 130.

The base film 110 has a sheet-shape. The base film 110 comprises a flexible material, so that even when the base film 110 is bent to form an angle above 90°, the base film 110 is not broken. For example, the base film 110 comprises polyethylene terephtahlate (PET).

The light reflection layer 120 is formed on the base film 110, such that the light reflection layer 120 faces the light guide plate 200. The light reflection layer 120 reflects the third light 60 that is leaked from the first face 230 of the light guide plate 200 toward the light guide plate 200. The light reflection layer 120 comprises a metal that has ductility, so that even when the light reflection layer 120 is bent to form an angle above 90°, the light reflection layer 120 is not broken.

A thickness of the light reflection layer 120 is only hundreds of nm. The light reflection layer 120 may comprise silver (Ag), aluminum (Al) or aluminum alloy.

Figure 8:
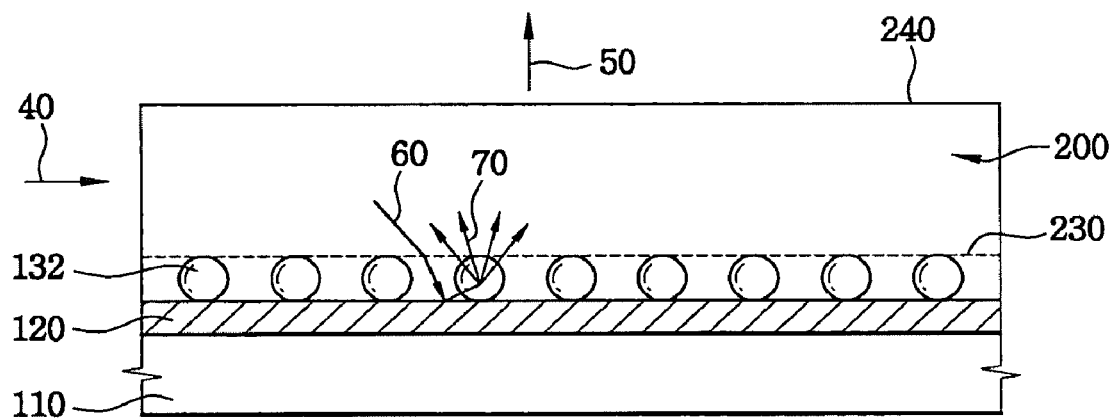
FIG. 8 is a schematic cross-sectional view showing a light guiding module of FIG. 6.

FIG. 8 is a schematic cross-sectional view showing a light guiding module of FIG. 6.

Referring to FIG. 8, the light diffusion layer 130 includes a plurality of beads 132. The beads 132 may have same size or different size with each other. The beads 132 are attached on the light reflection layer 120 via an adhesive. The light diffusion layer 130 diffuses the third light 60 that is reflected on the light reflection layer 120 to form the fourth light 70.

Figure 9:
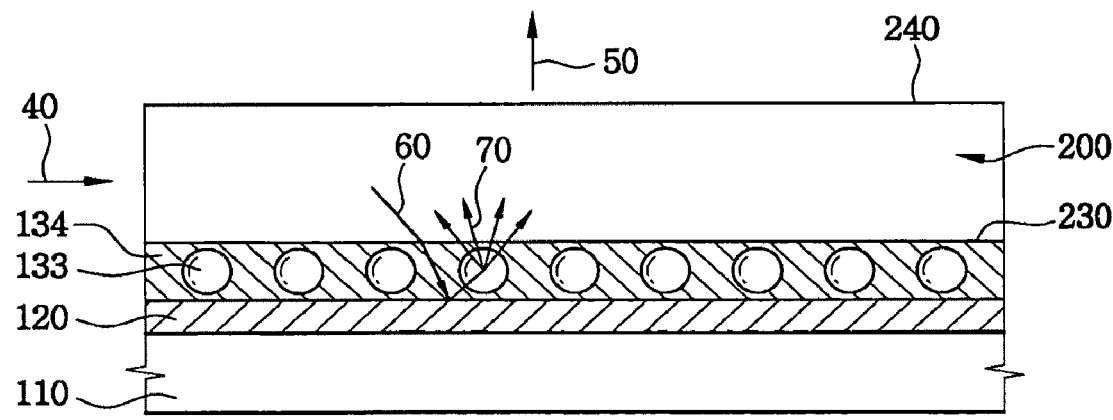
FIG. 9 is a schematic cross-sectional view showing a light guiding module according to a fourth embodiment of the present invention.

FIG. 9 is a schematic cross-sectional view showing a light guiding module according to a fourth embodiment of the present invention.

Referring to FIG. 9, the light diffusion layer 130 includes a binder 134 and a plurality of beads 133. The binder 134 is mixed with the beads 133 and coated on the light reflection layer 120. The beads 133 may have same size or different size with each other. The beads 133 or the binder 134 diffuse(s) the third light 60 to form the fourth light 70.

The diffusively reflective film 100 including the base film 110, the light reflection layer 120 and the light diffusion layer 130 is disposed under the light guide plate 200, such that the diffusively reflective film 100 faces the first face 230 of the light guide plate 200.

Referring again to FIG. 6, the diffusively reflective film 100 includes a fixing part 150. A protrusion that protrudes from an edge of the diffusively reflective film 100 is bent to form the fixing part 150. The fixing part 150 enwraps a portion of the side face 225 and the second face 240.

According to Embodiment 5, the light guiding module 300 includes the light guide plate 200 and the diffusively reflective film 100. The light guide plate 200 transforms the first light 40 that is a zero-dimensional light or a one-dimensional light into the second light 50 that is two-dimensional light. The diffusively reflective film 100 diffusively reflects the third light 60 that is leaked from the light guide plate 200 toward the light guide plate 200, so that the luminance is enhanced.

Embodiment 6

Figure 10:
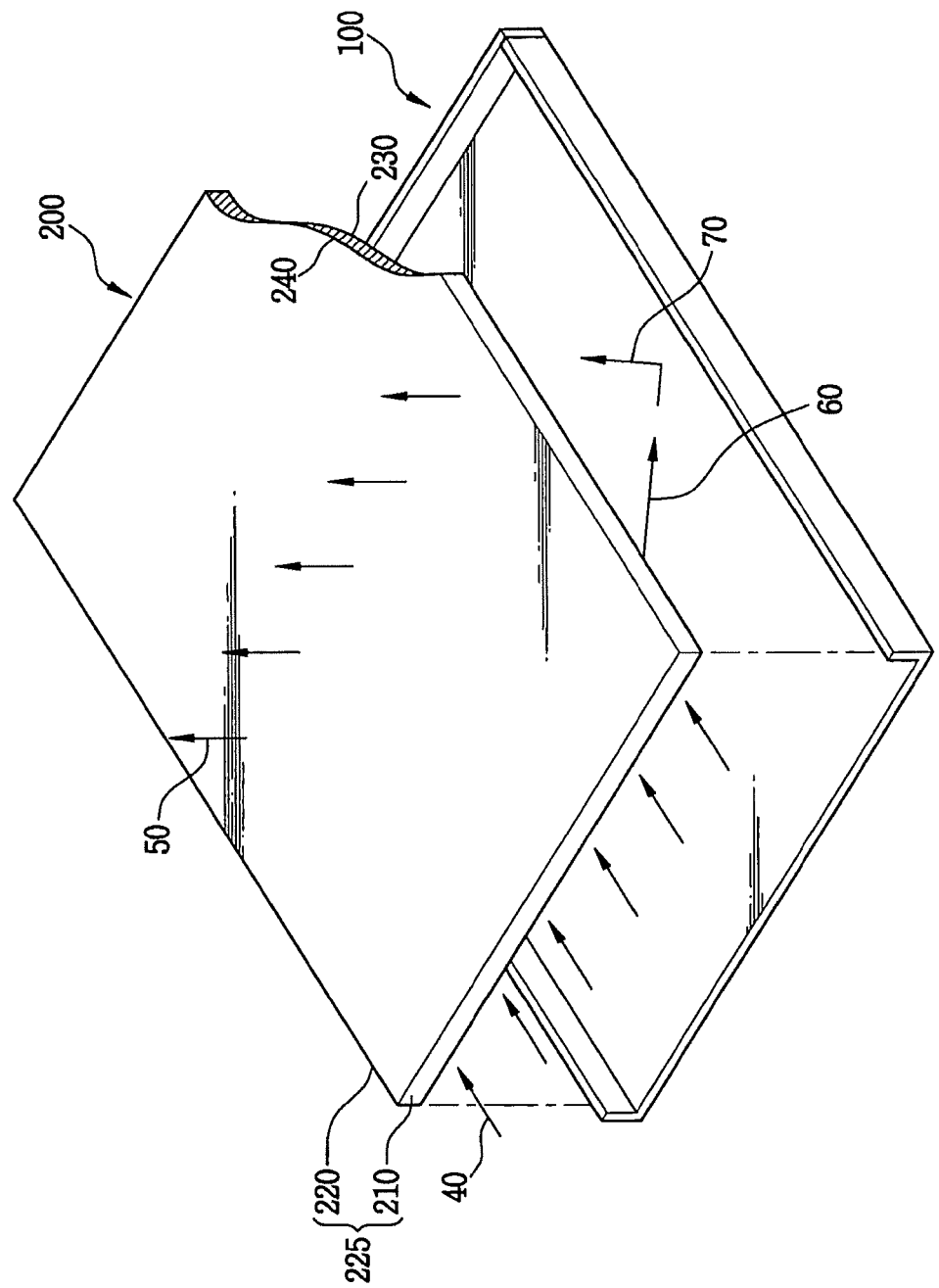
FIG. 10 is an exploded perspective view showing a light guiding module according to a sixth exemplary embodiment of the present invention.

FIG. 10 is an exploded perspective view showing a light guiding module according to a sixth exemplary embodiment of the present invention.

The light guiding module is same as in Embodiment 5 except for a diffusively reflective film. Thus, the same reference numerals will be used to refer to the same or like parts as those described in Embodiment 5 and any further explanation will be omitted.

Referring to FIG. 10, a diffusively reflective film 100 is bent to cover a second side face 220 and a first face 230. The diffusively reflective film 100 reflects a third light 60 that is leaked from the second side face 220 or the first face 230 to transform the third light 60 into a fourth light 70. The diffusively reflective film 100 does not cover a first side face 210 of the light guide plate 200, so that the first light 40 may enter the light guide plate 200 through the first side face 210.

A portion of the first light 40 that enters the light guide plate 200 through the first side face 210 is leaked through the second side face 220 or the first face 230 to form the third light 60. The diffusively reflective film 100 diffusively reflects the third light 60 toward the light guide plate 200 to form the fourth light 70. The fourth light 70 enters the light guide plate 200. Thus, an amount of the second light 50 that exits from the light guide plate 200 increases.

Embodiment 7

Figure 11:
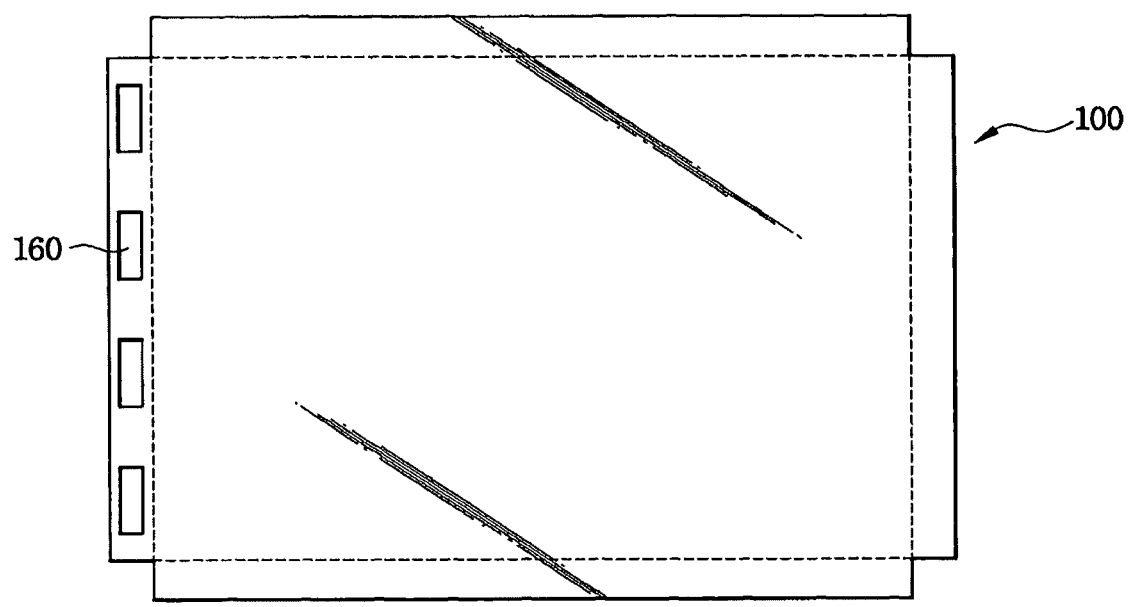
FIG. 11 is a plan view showing a diffusively reflective film according to a seventh exemplary embodiment of the present invention.
Figure 12:
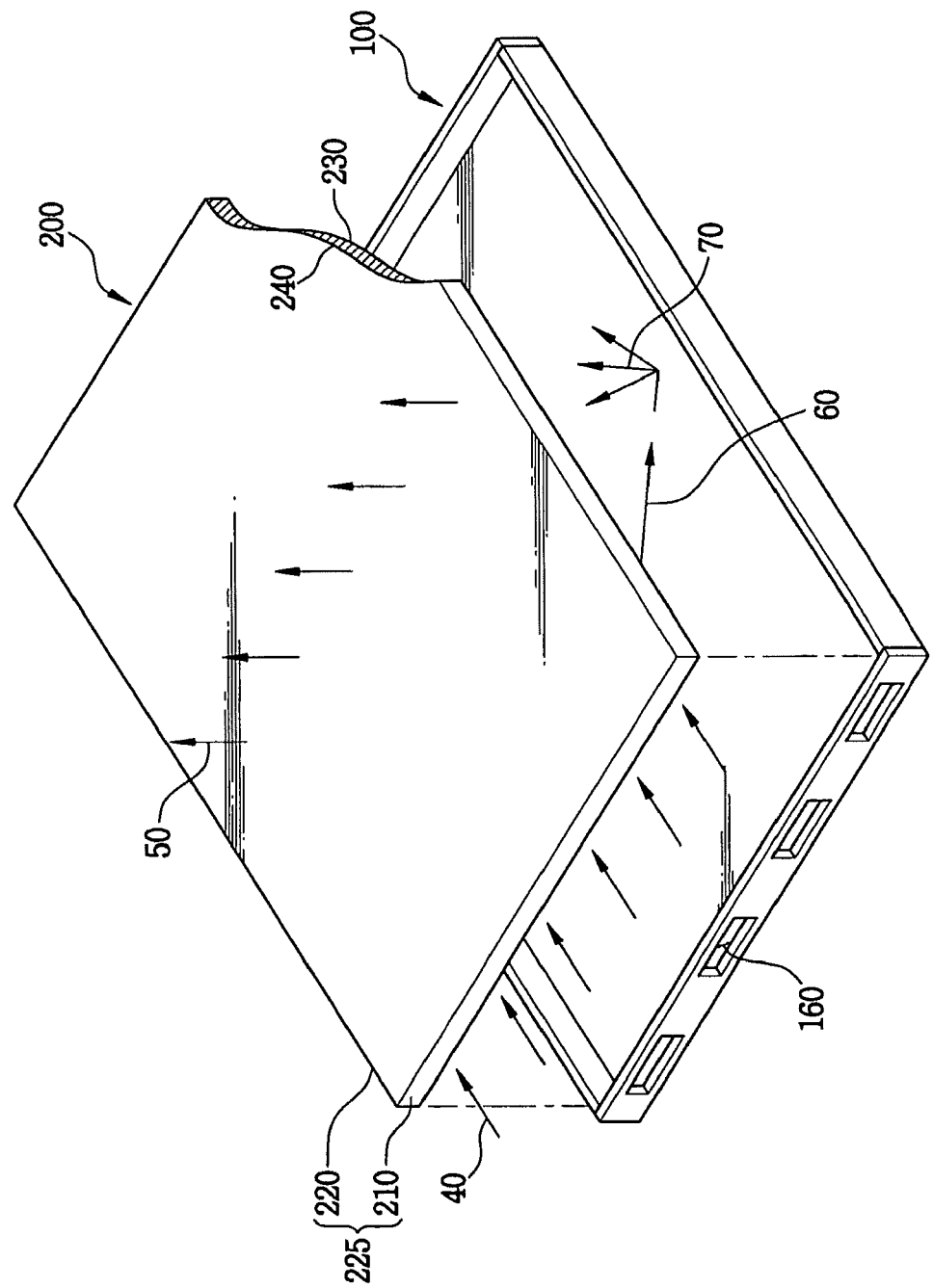
FIG. 12 is an exploded perspective view showing a light guiding module employing a diffusively reflective film of FIG. 11.

FIG. 11 is a plan view showing a diffusively reflective film according to a seventh exemplary embodiment of the present invention, and FIG. 12 is an exploded perspective view showing a light guiding module employing a diffusively reflective film of FIG. 11.

The light guiding module is same as in Embodiment 6 except for the diffusive reflective film. Thus, same reference numerals will be used to refer to the same or like parts as those described in Embodiment 6 and any further explanation will be omitted.

Only a diffusively reflective film is different in comparison with Embodiment 6. Thus, the same reference numerals will be used to refer to the same or like parts as those described in Embodiment 6.

Referring to FIGS. 11 and 12, a diffusively reflective film 100 covers a first side face 210, a second side face 220 and a first face 230. Thus, the diffusively reflective film 100 diffusively reflects light that leaks from the first side face 210, the second side face 220 or the first face 230 toward the light guide plate 200. A portion of the diffusively reflective film 100 corresponding to the first side face 210 includes at least one opening 160, so that a first light 40 is allowed to enter the light guide plate 200 through the opening 160.

According to Embodiment 7, the first side face 210, the second side face 220 and the first face 230 are covered with the diffusively reflective film 100. The portion of the diffusively reflective film 100 corresponding to the first side face includes the opening through which the first light 40 enters the light guide plate 200. Thus, the first light 40 does not leak from the light guide plate 200 to increase an amount of light exiting via the second face 240.

Embodiments of a Backlight Assembly

Embodiment 8

Figure 13:
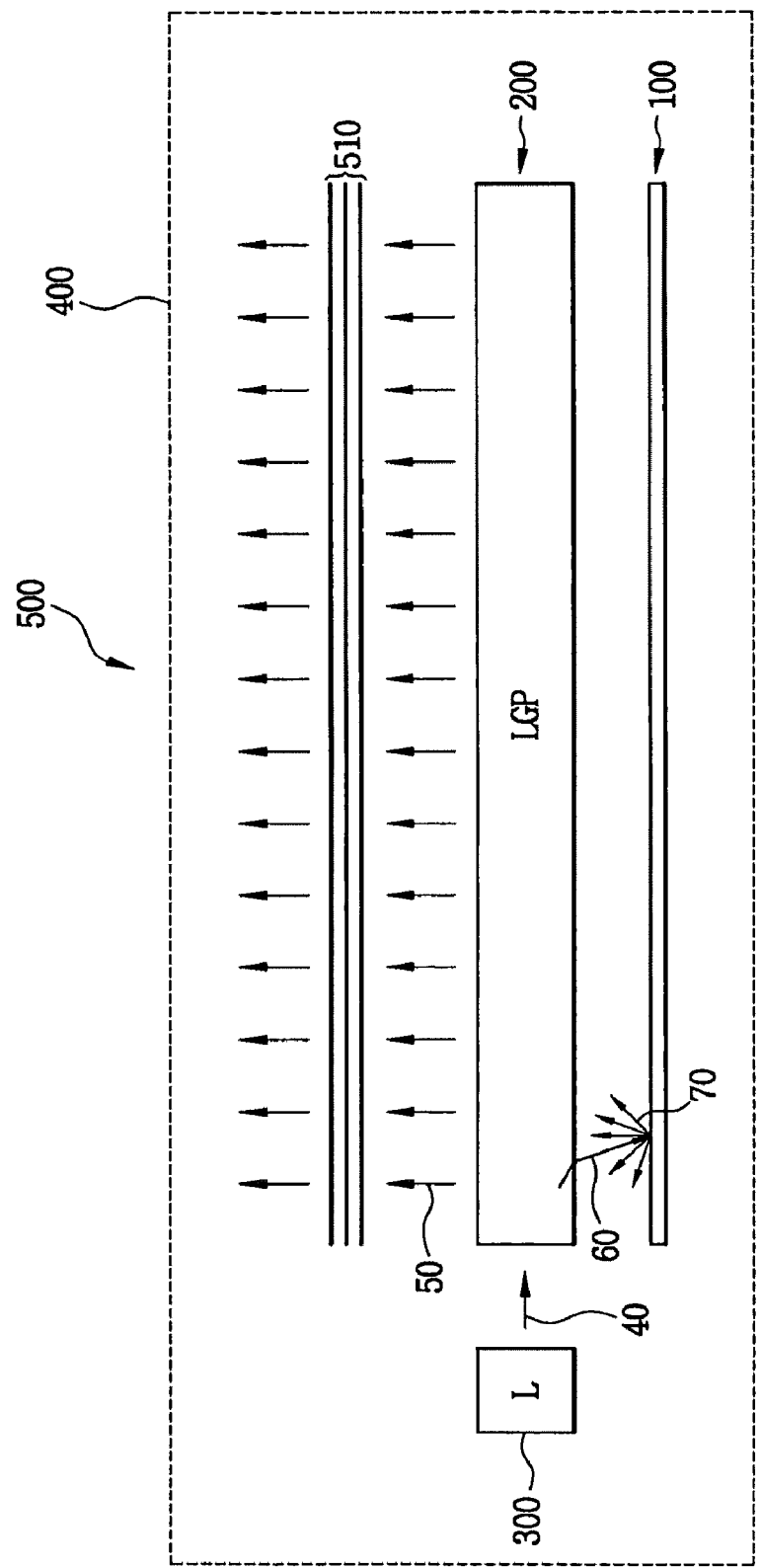
FIG. 13 is a schematic view of a backlight assembly according to an eighth exemplary embodiment of the present invention.
Figure 14:
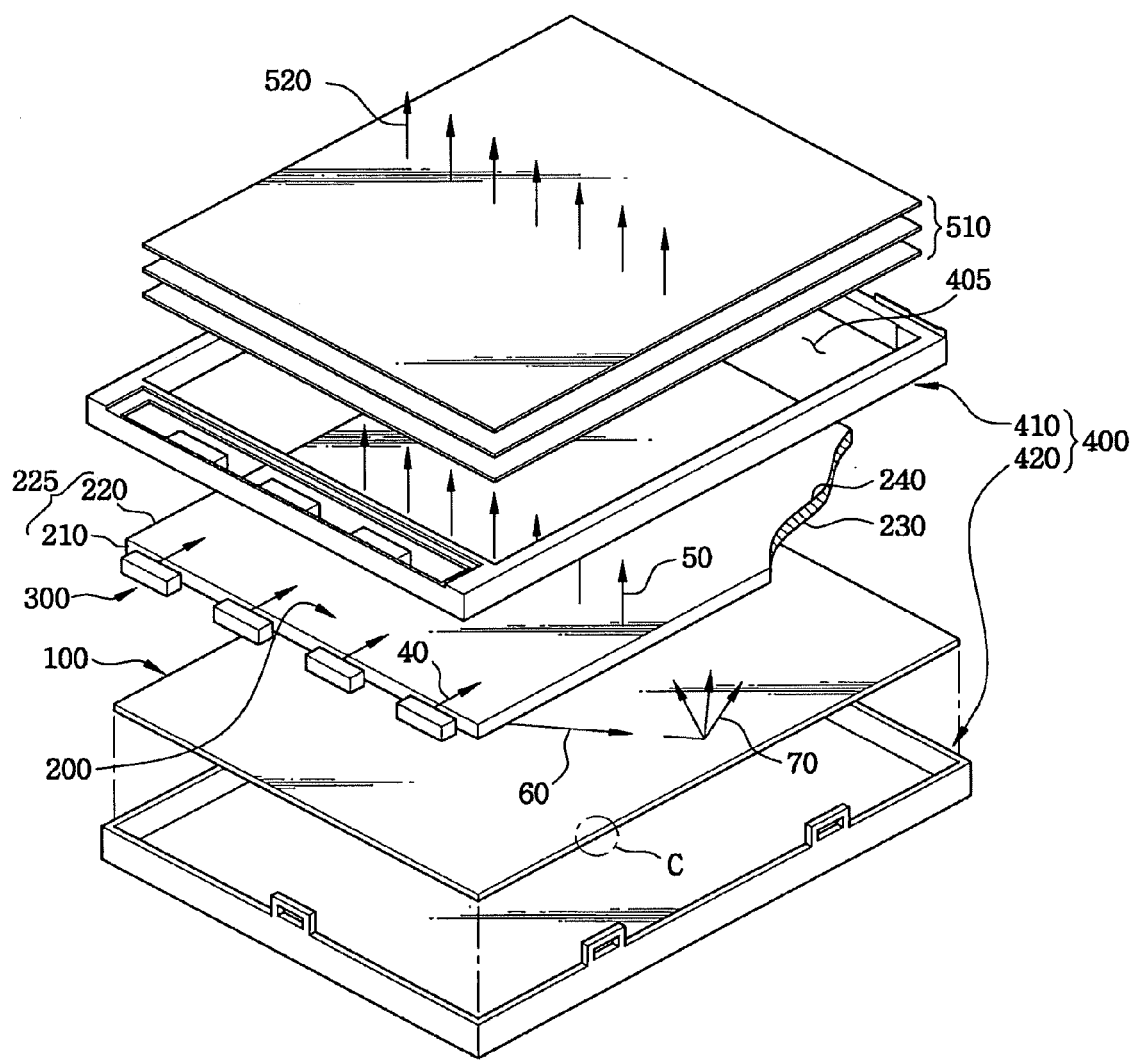
FIG. 14 is an exploded perspective view showing a backlight assembly of FIG. 13.
Figure 15:
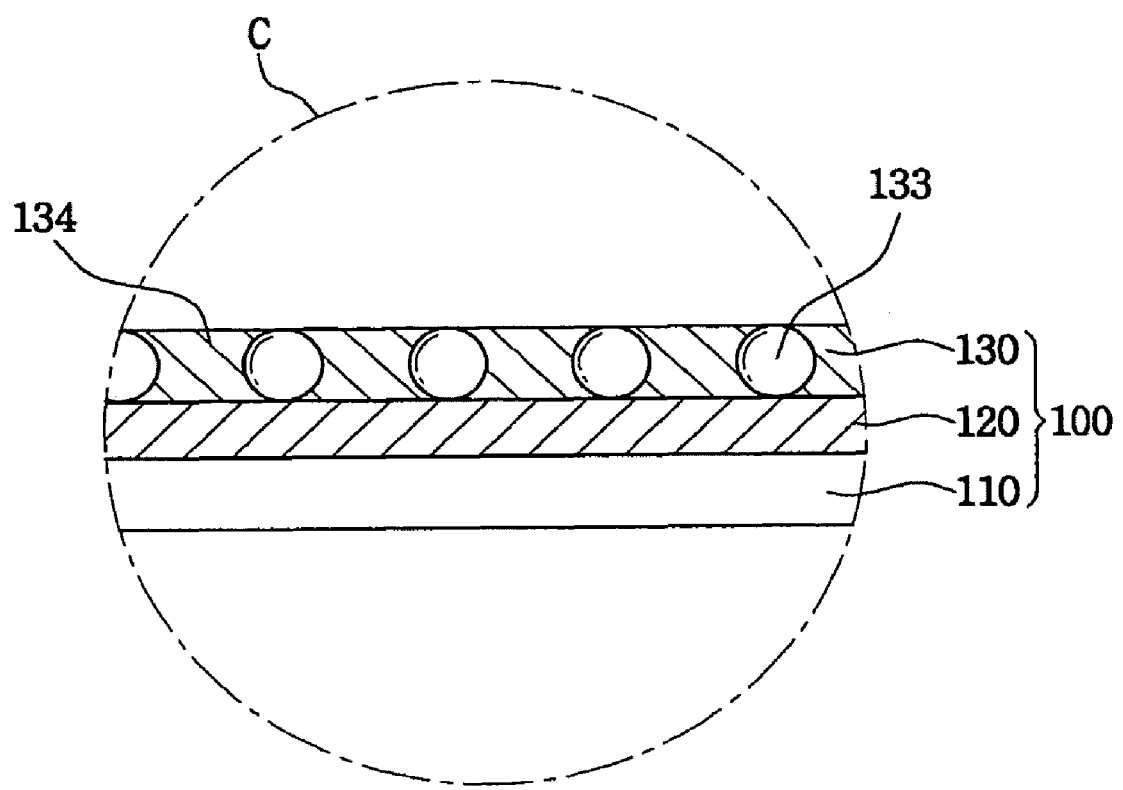
FIG. 15 is an enlarged view of 'C' of FIG. 14.

FIG. 13 is a schematic view of a backlight assembly according to an eighth exemplary embodiment of the present invention, FIG. 14 is an exploded perspective view showing a backlight assembly of FIG. 13, and FIG. 15 is an enlarged view of a portion 'C' of FIG. 14.

Referring to FIGS. 13 to 15, a backlight assembly 500 includes a receiving container 400, a lamp 300, a light guide plate 200 and a diffusively reflective film 100. The backlight assembly 500 may further include optical sheets 510.

The receiving container 400 includes a first receiving container 410 and a second receiving container 420.

The first receiving container 410 has a rectangular frame shape including an opening 405. The first receiving container may comprise plastics. The first receiving container 410 receives the lamp 300, the light guide plate 200 and the diffusively reflective film 100, and it fixes them as well.

The second receiving container 420 is combined with the first receiving container 410 to support the lamp 300, the light guide plate 200 and the diffusively reflective film 100. The second receiving container 420 may comprise a metal.

The lamp 300 generates a first light 40. The first light 40 has a first light distribution. The lamp 300 may be a plurality of light emitting diodes (LED) that generate a zero-dimensional light. The light emitting diodes are disposed, such that the light emitting diodes are spaced apart with each other. A cold cathode fluorescent lamp (CCFL) that generates a one-dimensional light may be used as the lamp 300.

The light guide plate 200 transforms the first light 40 that has a first light distribution into a second light 50 that has a second light distribution. A uniformity of the second light distribution is higher than that of the first light distribution. For example, the light guide plate 200 transforms the first light 40 that has zero-dimensional light into the second light 50 that has two-dimensional light.

The light guide plate 200 includes a plurality of side faces 225, a first face 230 and a second face 240.

The side faces 225 include a first side face 210 and a second side face 220. The first light 40 enters the light guide plate 200 through the first side face 210.

The first face 230 is connected to the side faces 225, such that the first face 230 forms a right angle with respect to the side faces 225.

The first face 230 reflects the first light 40 that enters the light guide plate 200 through the first side face 210 toward the second face 240. The first face 230 may include a plurality of light reflection dots so as to enhance a reflectivity.

The second face 240 is connected with the side faces 225, such that the second face 240 forms a right angle with respect to the side faces 225. Thus, the second face 240 faces the first face 230. The second light 50 exits the light guide plate 200 through the second face 240.

Referring to FIG. 15, the diffusively reflective film 100 includes a base film 110, a light reflection layer 120 and a light diffusion layer 130.

The base film 110 has a sheet shape. The base film 110 comprises a flexible material. Thus, even when the base film 110 is bent to form an angle above 90°, the base film 110 is not to be broken. For example, the base film comprises polyethylenerephtahlate (PET).

The light reflection layer 120 is disposed on the base film 110, such that the light reflection layer 120 faces the first face 230 of the light guide plate 200. The light reflection layer 120 reflects a third light 60 that leaks from the first face 230 toward the light guide plate 200. The light diffusion layer 130 diffuses the third light 60 to form a fourth light 70. The light reflection layer 120 comprises a metal that has ductility and a high reflectivity, so that the light reflection layer 120 is not broken, even when the light reflection layer 120 is bent to form an angle above 90°. For example, the light reflection layer 120 may comprise silver (Ag), aluminum (Al) or an alloy of aluminum.

The light reflection layer 120 may be formed via a sputtering method or a vacuum plating.

The light diffusion layer 130 includes a binder 134 and a plurality of beads 133. The binder 134 has an adhesive property and a viscosity. The binder 134 is mixed with the beads 133 and spread to cover the light reflection layer 120. A refractivity of the beads 134 is different with that of air. The beads 134 may have same size, or different size with each other.

The binder 134 or the beads 133 diffuse(s) the third light 60 that is reflected on the light reflection layer 120 to form the fourth light 70.

Referring again to FIG. 13, the optical sheets 510 are disposed on the second face 240 of the light guide plate 200. The optical sheets 510 diffuse the second light 50 that exits from the light guide plate 200 to form a fifth light 520. The optical sheets 510 may include a diffusion sheet, a prism sheet, a protection sheet etc.

Embodiment 9

Figure 16:
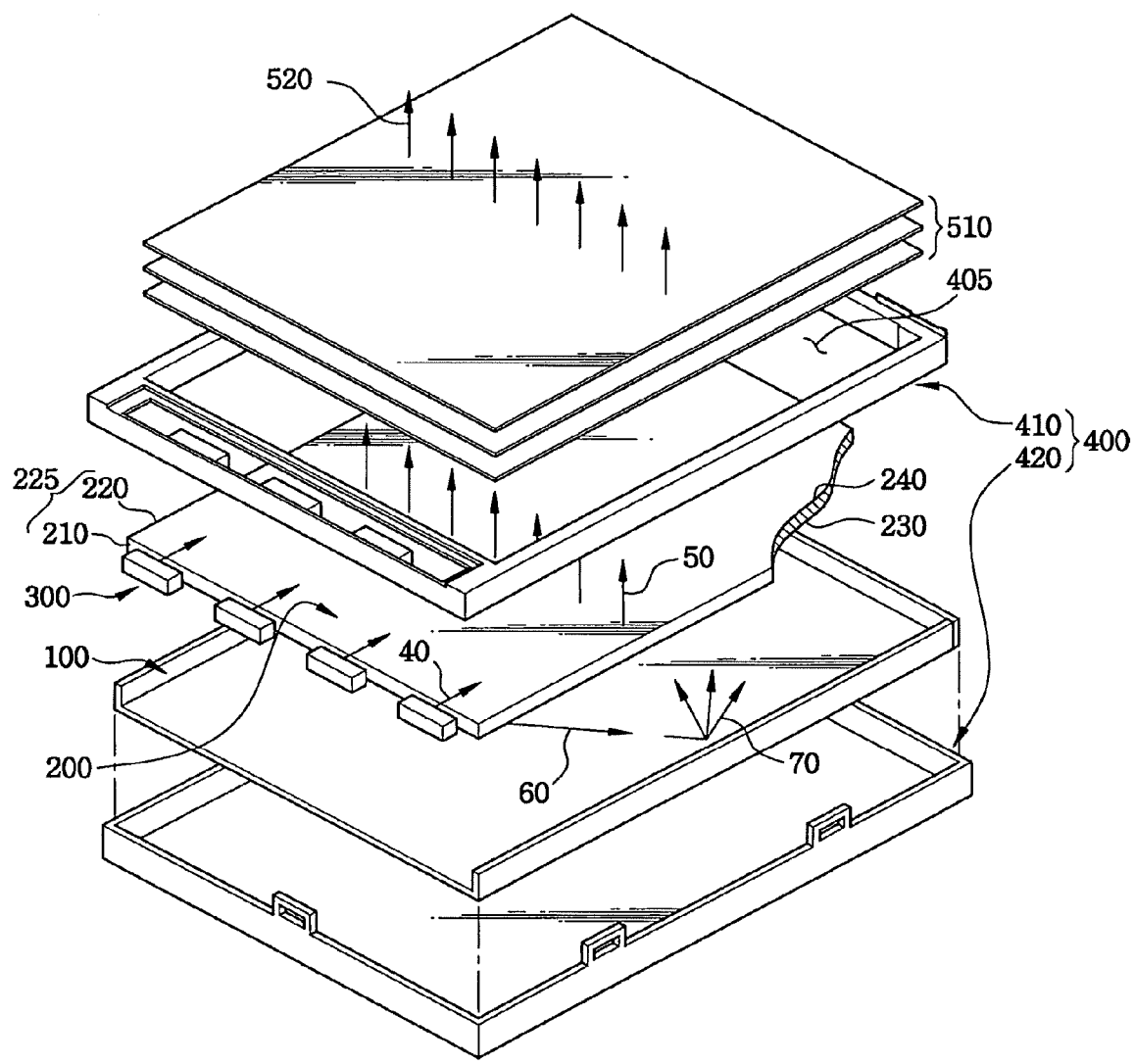
FIG. 16 is an exploded perspective view showing a backlight assembly according to a ninth exemplary embodiment of the present invention.

FIG. 16 is an exploded perspective view showing a backlight assembly according to a ninth exemplary embodiment of the present invention.

The back light assembly is same as in Embodiment 8 except for a diffusively reflective film. Thus, the same reference numerals will be used to refer to the same or like parts as those described in Embodiment 8 and any further explanation will be omitted.

Referring to FIG. 16, a diffusively reflective film 100 diffusively reflects a third light 60 that leaks from a second side face 220 or a first face 230 toward a light guide plate 200. The diffusively reflective film 100 does not cover a first side face 210. Thus, a first light 40 generated from a lamp 300 may enter the light guide plate 200 through the first side face 210.

According to Embodiment 9, the first light 40 generated from the lamp 300 enters the light guide plate 200 through the first side face 210 that is not covered with the diffusively reflective film 100. The third light 60 which leaks from the second side face 220 or the first face 230 is reflected by the diffusively reflective film 100 to form a fourth light 70. The fourth light 70 re-enters the light guide plate 200 to increase an amount of the second light 50 that exits the light guide plate through the second face 240 of the light guide plate 200.

Embodiment 10

Figure 17:
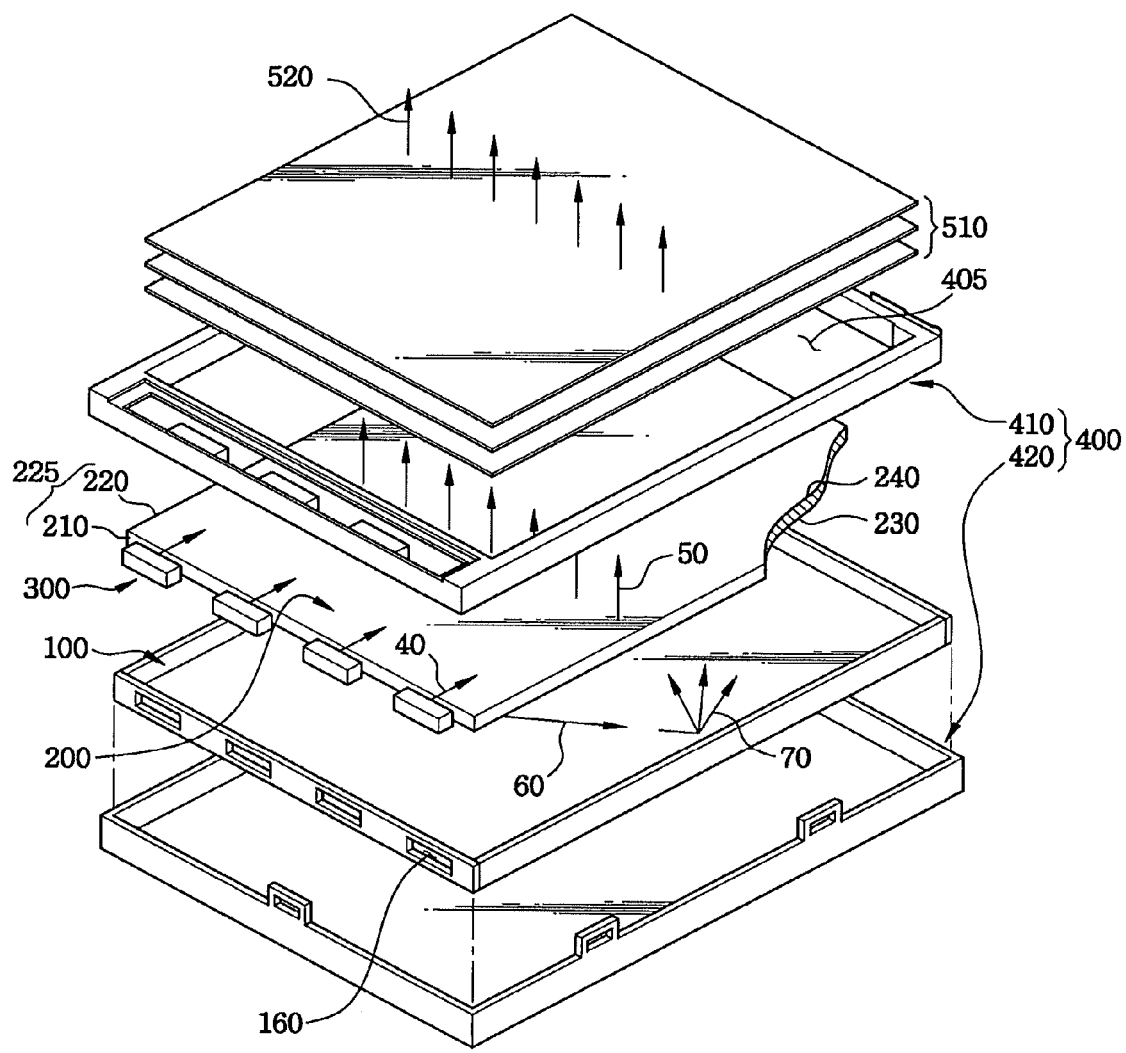
FIG. 17 is an exploded perspective view showing a backlight assembly according to a tenth exemplary embodiment of the present invention.

FIG. 17 is an exploded perspective view showing a backlight assembly according to a tenth exemplary embodiment of the present invention.

Only a diffusively reflective film is different in comparison with Embodiment 9. Thus, the same reference numbers will be used to refer to the same or like parts as those described in Embodiment 9.

Referring to FIG. 17, a diffusively reflective film 100 covers a first side face 210, a second side face 220 and a first face 230 of the light guide plate 200. Thus, the diffusively reflective film 100 reflects light that leaks from the first side face 210, the second side face 220 and the first face 230 toward the light guide plate 200. A portion of the diffusively reflective film 100, which corresponding to the first side face 210, includes an opening 160. A first light 40 generated from a lamp 300 enters the light guide plate 200 via the first side face 210.

According to Embodiment 10, the diffusively reflective film 100 covers the first side face 210, the second side face 220 and the first face 230. That is, only the second face 240 is not covered with the diffusively reflective film 100. Thus, the first light that enters the light guide plate 200 does not leak from the light guide plate 200 to increase an amount of the second light 50 that exits the light guide plate 200 though the second face 240.

Embodiment of a Liquid Crystal Display Apparatus

Embodiment 11

Figure 18:
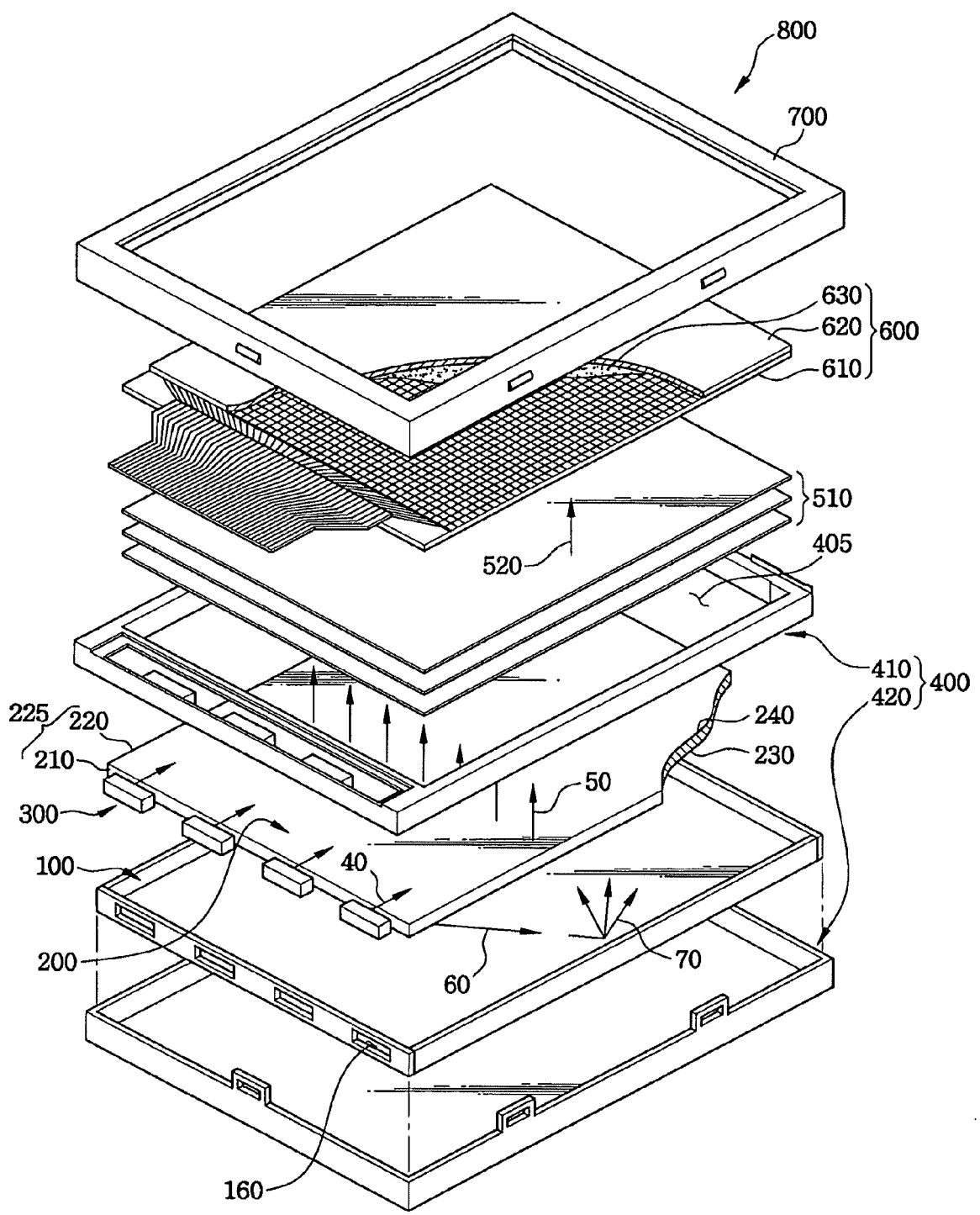
FIG. 18 is an exploded perspective view showing a backlight assembly according to an eleventh exemplary embodiment of the present invention.

FIG. 18 is an exploded perspective view showing a backlight assembly according to an eleventh exemplary embodiment of the present invention.

The backlight assembly is same as in Embodiment 10 except that the back light assembly further comprises a liquid crystal display panel and a chassis. Thus, the same reference numerals will be used to refer to the same or like parts as those described in Embodiment 10 and any further explanation will be omitted.

Referring to FIG. 18, a liquid crystal display apparatus 800 includes a receiving container 400, a diffusively reflective film 100, a lamp 300, a light guide plate 200, a liquid crystal display panel 600 and a chassis 700.

The receiving container 400 receives the liquid crystal display panel 600, such that the liquid crystal display panel faces the light guide plate 200.

The liquid crystal display panel 600 includes a thin film transistor substrate 610, a color filter substrate 620 and a liquid crystal layer 630.

A plurality of pixel electrodes is arranged in a matrix shape. A thin film transistor (TFT) is electrically connected with the pixel electrode. An image voltage is applied to the pixel electrode via the thin film transistor.

The color filter substrate 620 faces the thin film transistor substrate 610. The color filter substrate 620 includes a common electrode.

A reference voltage is applied to the common electrode.

A liquid crystal layer 630 is interposed between the thin film transistor substrate 610 and the color filter substrate 620.

An arrangement of the liquid crystal layer 630 is changed due to electric fields formed between the pixel electrode and the common electrode, so that a transmissivity of a second light 50 that exits from the light guide plate 200 and pass through optical sheets 510 is adjusted to display an image.

The chassis 700 is combined with the receiving container 400, so that the liquid crystal display panel 600 is supported. The chassis 700 may comprise a metal to protect the liquid crystal display panel 600 that is fragile.

According to embodiments of the present invention, the diffusively reflective film may be bent to cover the light guide plate without being broken so as to increase the amount of light. Thus, a display quality is enhanced.

Further, the diffusively reflective film covers the first side face, the second side face and the first face of light guide plate at once. Thus, productivity is enhanced and its manufacturing cost is reduced.

Having described the exemplary embodiments of the present invention and its advantages, it is noted that various changes, substitutions and alterations can be made herein without departing from the spirit and scope of the invention as defined by appended claims.

What is claimed is:

1. A backlight assembly comprising:
  a receiving container;
  a lamp disposed in the receiving container, the lamp generating a first light having a first light distribution;
  a light guide plate disposed in the receiving container, the light guide plate transforming the first light into a second light having a second light distribution; and
  a diffusively reflective film disposed in the receiving container, the diffusively reflective film diffusively reflecting a third light that leaks from the light guide plate toward the light guide plate as a fourth light,
  wherein the diffusively reflective film comprises a base film that is flexible, a light reflection layer disposed on the base film, the light reflection film reflecting the third light, and a light diffusion layer comprising a plurality of beads on the light refection layer, the light diffusing layer diffusing the third light to form the fourth light,
  wherein the light guide plate comprises first and second side faces, and first and second faces, the first and second side faces connecting the first and second faces, such that the first and second faces face with each other, the first light entering the light guide plate via the first side face, the second light exiting the light guide plate via the second face,
  wherein the diffusively reflective film is bent to cover the first and second side faces and the first face, wherein a portion of the diffusively reflective film corresponding to the first side face covers the first side face continuously from a lower end to an upper end of the first side surface, the portion of the diffusively reflective film including an opening, the first light entering the light guide plate through the opening.

2. The backlight assembly of claim 1, wherein the diffusively reflective film faces the first face of the light guide plate.

3. The backlight assembly of claim 2, wherein the diffusively reflective film is bent to cover the second side face and the first face of the light guide plate.

4. The backlight assembly of claim 3, wherein the lamp is a light emitting diodes, which are disposed to face the first side face.

5. The backlight assembly of claim 1, wherein a light emitting diode (LED) that generates the first light is disposed in the receiving container.

* * * * *